United States Patent [19]
Martin

[11] Patent Number: 5,813,259
[45] Date of Patent: Sep. 29, 1998

[54] LOCKING DEVICE

[76] Inventor: Larry Randal Martin, 11608 Cannongate Rd., Cabot, Ark. 72023

[21] Appl. No.: 699,980

[22] Filed: Aug. 20, 1996

[51] Int. Cl.⁶ .................................................... E05B 71/00
[52] U.S. Cl. .................................. 70/234; 70/58; 70/417; 211/8; 211/5; 52/157
[58] Field of Search ............................. 70/234, 233, 58, 70/62, 417; 52/157; 211/4, 5, 7, 8

[56] References Cited

U.S. PATENT DOCUMENTS

| | | | |
|---|---|---|---|
| 621,072 | 3/1899 | Gregory | 70/234 |
| 636,629 | 11/1899 | Butcher | 70/234 |
| 3,067,846 | 12/1962 | Luebkeman | 52/157 |
| 3,295,274 | 1/1967 | Fulton | 52/157 |
| 3,739,609 | 6/1973 | Kaufman | 70/234 |
| 3,783,659 | 1/1974 | Rossi | 70/234 |
| 3,797,284 | 3/1974 | Grossman | 211/4 |
| 3,881,680 | 5/1975 | Lietaert, Jr. | 70/234 |
| 3,918,279 | 11/1975 | Williamson | 70/234 |
| 3,944,079 | 3/1976 | Boslough | 70/234 |
| 3,996,775 | 12/1976 | Waldron | 211/5 |
| 4,126,228 | 11/1978 | Bala et al. | 70/234 |
| 4,312,452 | 1/1982 | Waier | 211/8 |
| 5,501,086 | 3/1996 | Sherlock | 52/157 |

FOREIGN PATENT DOCUMENTS 8101926   11/1982   Netherlands ............................. 211/5

*Primary Examiner*—Darnell M. Boucher

[57] ABSTRACT

A locking stand for preventing theft of portable objects, such as boats, ATVs and bicycles. The stand comprises two hollow parts which are reinforced with free-wheeling solid metal bars to deter sawing. A first part has a base and a vertically extending auger-portion which is secured into the ground to an appropriate depth such that the base is securely mounted. The second part is U-shaped and is designed to fit around a part of a piece of portable equipment prior to being slid over the base and locked thereto.

1 Claim, 6 Drawing Sheets

LOCKING DEVICE

BACKGROUND

Description of Art

There is a need to secure from thievery certain types of equipment, which is commonly kept on property and yards. That type of equipment being mostly recreational in nature but not all-inclusive, such as, all terrain vehicles, boat trailers, lawn mowers, etc.

The common accepted method of securing said equipment is by the use of chains, padlocks and otherwise locked doors in storage facilities of various types. There appears to be several prior arts, which provide methods to secure personal objects as set forth in this invention. However, only one uses similar methodology.

Sherlock—U.S. Pat. No. 5,501,086 utilizes two augers at the distal end of two shanks to secure his locking device to the ground. My invention utilizes one auger at the distal end of one shank to secure the locking device to the ground. The major difference which affords my invention superior security over Sherlock's invention is the use of an internal free wheeling solid steel bar. This bar totally prevents the sawing of the shank for the purpose of separating and removing the object secured. When the saw blade strikes the internal bar the bar rolls with the saw blade thus preventing further cutting of the shank. Additionally the internal free wheeling solid steel bar adds density to the shank thus making it extremely difficult to cut using any type of conventional bolt cutter, (a cutter with a scissors like action designed to cut steel). The density when coupled with the diameter of the shank, which is larger than any known conventional bolt-cutter make my invention impossible to defeat in that manner.

Sherlock—U.S. Pat. No. 5,501,086 utilizes a conventional chain and a conventional padlock as the upper portion of his invention to secure an object to the rest of the locking device previously screwed/augured into the ground. My invention utilizes a formed steel construction of three rigid sides, which form an inverted "U". All three sections have free wheeling internal solid steel bars inserted. The same argument for added security against cutting applies as described in the previous paragraph. The chain approach as in Sherlock's invention affords very little security when compared to my invention. The two most common tools a thief carries are a hacksaw and boltcutters. With those common tools, Sherlock's invention can be easily defeated in a matter of seconds, while my invention simply cannot be defeated in that method.

There are several other inventions, which use similar types of upper encasement of the object to be secured. None of them employ the free wheeling solid steel bars or attach to the earth by the means of a shank with an auger at the distal end. Some of the inventions attach to the earth by being set in concrete or bolted to an immovable object. None of them offer the added security of internal freewheeling bars or the portability of my invention.

See:

Willaimson—U.S. Pat. No. 3,918,279
Gregory—U.S. Pat. No. 621,072
Butcher—U.S. Pat. No. 7,1899
Bala—U.S. Pat. No. 4,126,228
Boslough—U.S. Pat. No. 3,944,079
Kaufmann—U.S. Pat. No. 3,739,609
Rossi—U.S. Pat. No. 3,783,659
Zwemmer—21.04.81-NL-001926
Waldron—U.S. Pat. No. 3,996,775
Grossman—U.S. Pat. No. 3,797,284
Waier—U.S. Pat. No. 4,312,452

My invention prevents and greatly deters thievery, employing methodology that is unique, especially in the area of added security. This methodology has not been duplicated or anticipated by any other invention.

SUMMARY

A locking device using the technique of encircling part of an object to be secured with attachment to a previously installed base and physically locked with a conventional lock.

Preferred Embodiment—Description

Figure 1:
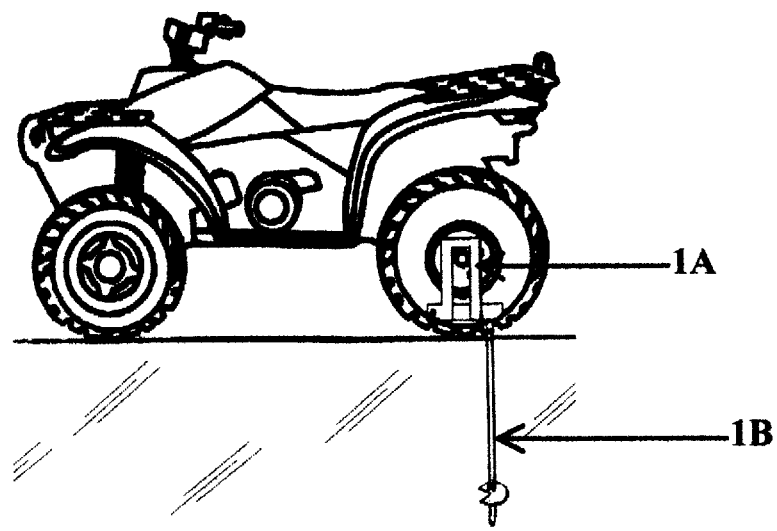
FIG. 1 is a perspective view of the locking device attached to an all terrain vehicle shown from the side and rear of the all terrain vehicle.
Figure 1:
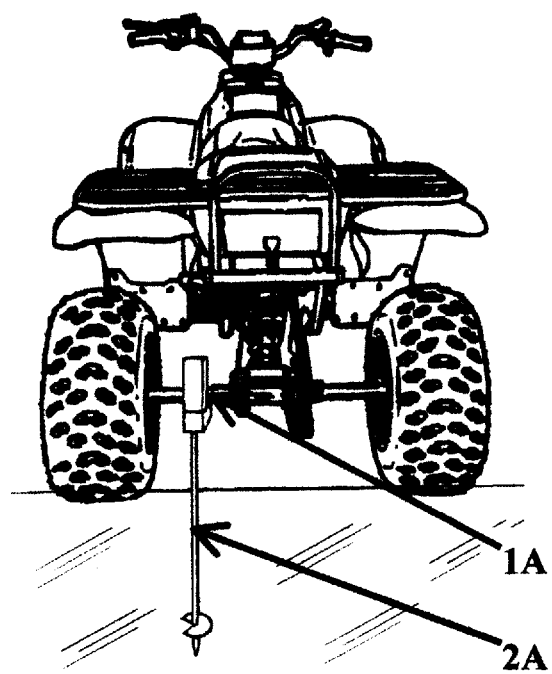

FIG. 1 shows two views of an all terrain vehicle secured to the ground with the locking device. The yoke (1A), which has three rigid sides and forms an inverted "U" with two horizontal tubes attached to the ends of each leg of said yoke (1A), is fitted over the rear axle of the all terrain vehicle. The all terrain vehicle is then moved over the site where the auger base (1B), a horizontal hollow tube attached to a vertical shank of a predetermined length with an auger attached to the distal end of said shank, has been previously augured into the ground. The all terrain vehicle is moved in such a manner as to allow the horizontal hollow tube of said base (1B) to slide into the two horizontal hollow tubes of said yoke (1A). The said yoke (1A) and the said base (1B) are then joined together by placing and locking a conventional lock through the alignment holes in both the said yoke (1A) and the said base (1B).

Figure 2:
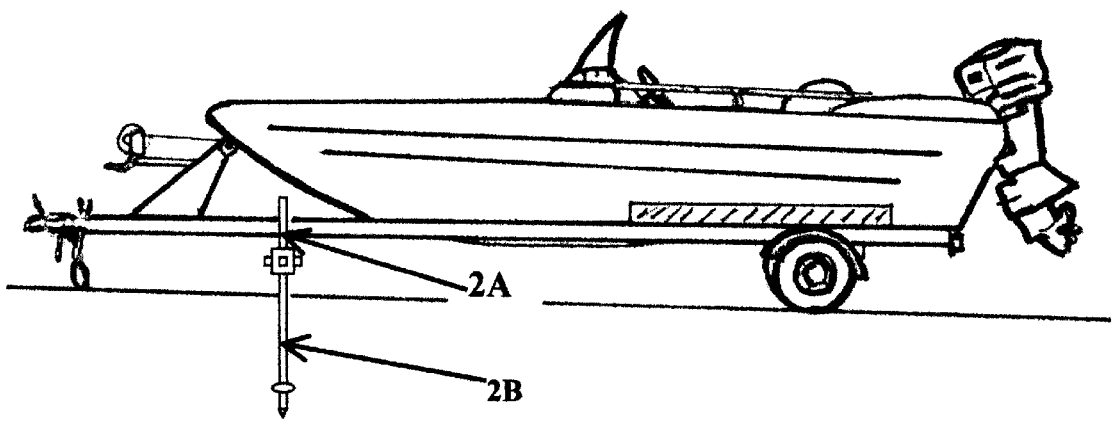
FIG. 2 is a perspective view of the locking device attached to a boat trailer.

FIG. 2 shows a view of a boat and boat trailer secured to the ground with the locking device. Said yoke (2A) is placed over the tongue of the trailer. The trailer is then moved over said auger base (2B) and attached to said yoke (2A) with a conventional lock.

Figure 3:
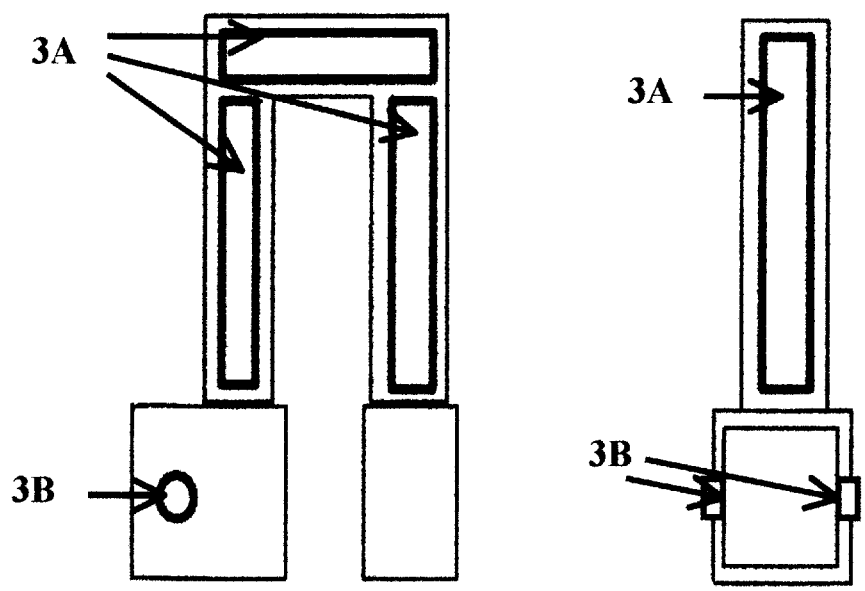
FIG. 3 is a front and side view of the upper portion of the locking device.
Figure 5:
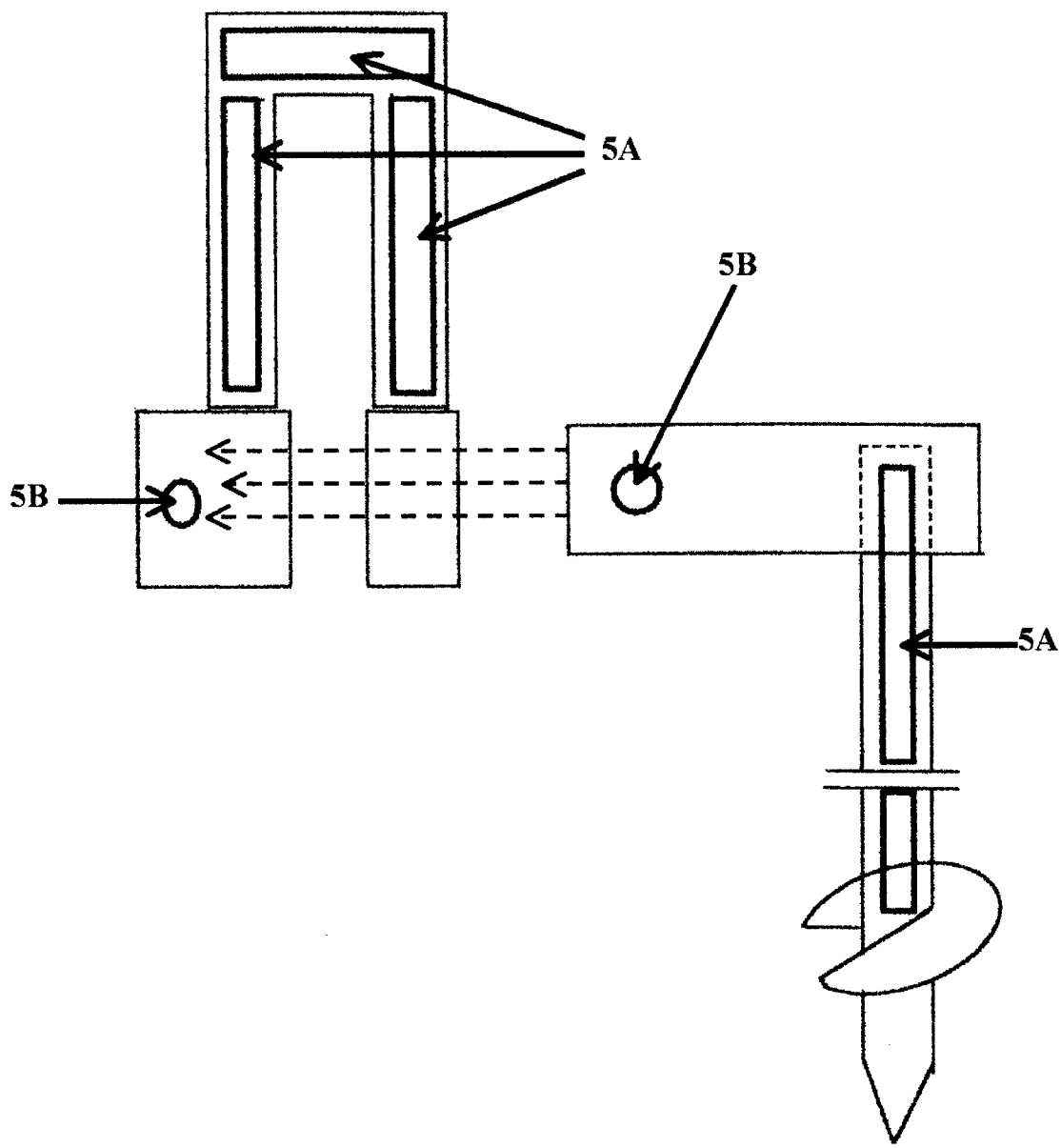
FIG. 5 is a side view of the upper and lower portions of the locking device showing how they interconnect.

FIG. 3 shows a front and side view of said yoke. Free wheeling bars (3A), unattached solid steel bars of a predetermined diameter and length, are located inside the horizontal and vertical structures of said yoke. The purpose of said free wheeling bars (3A) is to prevent the cutting of said yoke with a conventional hacksaw, a saw designed to cut metal. When the saw blade of said conventional hacksaw penetrates the outer structure of said yoke and strikes said free wheeling bars (3A), the said free wheeling bars (3A) will roll with the sawing motion of the saw blade, thus preventing additional cutting of said yoke. The said yoke is placed over the object to be secured and moved to the said auger base whereas the horizontal tube of the said auger base is located inside the two horizontal tubes of said yoke as shown in FIG. 5. The drilled holes (3B), holes of a predetermined diameter in both the said yoke and the said auger base are aligned and a conventional lock, as drawn in FIG. 6, is placed through the said drilled holes (3B) to secure the said yoke and the said auger base together.

Figure 4:
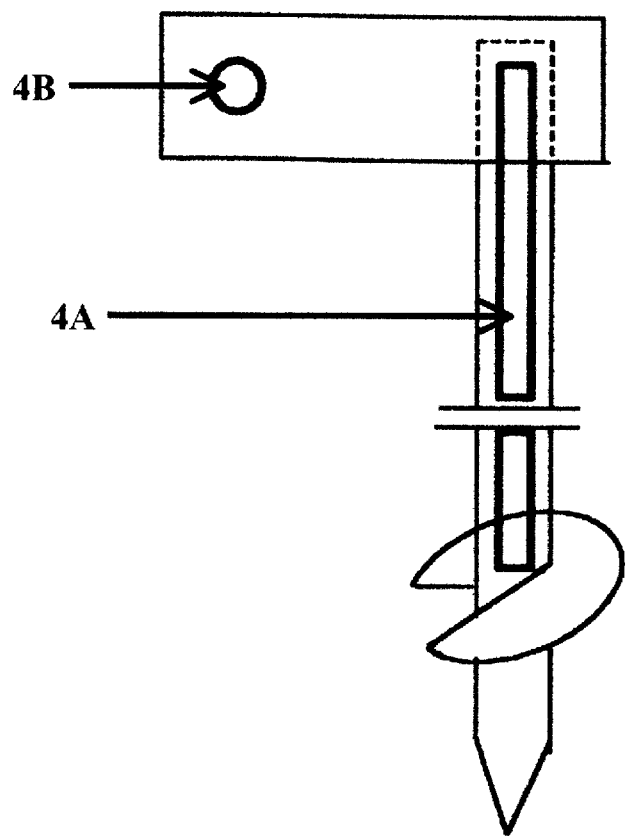
FIG. 4 is a side view of the lower portion of the locking device.

FIG. 4 shows a side view of the said auger base of the locking device. A free wheeling bar (4A), an unattached solid steel bar of a predetermined diameter and length, is located located inside the vertical portion of the said auger base to serve as a preventative against cutting by a conventional hacksaw, as described in FIG. 3. The drilled hole (4B) will align with the drilled holes (3B) of the said yoke when the said auger base and the said yoke are interconnected and secured with said conventional lock.

FIG. 5 shows how said yoke as described in FIG. 3 and said auger base as described in FIG. 4 are connected. The horizontal tube of said auger base is placed inside the two horizontal tubes of said yoke. Said free wheeling bars (5A) are located internally to prevent sawing as described in the FIG. 3 narrative. Said drilled holes (5B) will line up once said yoke and said auger base are interconnected to allow the securing of the two parts with a conventional lock as shown in the FIG. 6 drawing.

Figure 6:
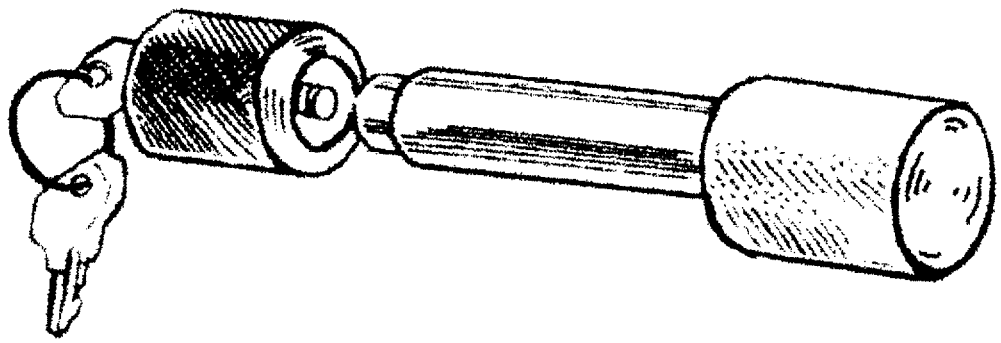
FIG. 6 is a side view of the type of conventional lock used to secure the upper and lower portions of locking device.

FIG. 6 shows a conventional lock that may be used to secure said yoke and said auger base together.

Preferred Embodiment—Operation

The locking device functions effectively as follows:

The said auger base is located at such point above the ground that one wishes to park or locate equipment to be secured. Said auger base is then augured/screwed into the ground to the appropriate depth to allow the horizontal tube of said auger base to a point above the ground to accommodate equipment to be secured. The equipment is then moved within a few inches of said auger base. The said yoke is placed over a part of the equipment which will allow said yoke to interconnected with said auger base. An example of the part of the equipment would be the axle of an all terrain vehicle or the tongue of a trailer as shown in FIGS. 1 and 2, however it is not restricted to those examples. The equipment is then moved to allow the horizontal tube of said auger base to slide inside the horizontal tubes of said yoke. The said yoke and said auger base are then secured together with a conventional lock such as that drawn in FIG. 6.

Conclusions and Scope

According, it can be seen that I have provided a unique invention for securing by locking one's property and preventing or making it extremely difficult for a person or persons without a key to the conventional lock to remove said property.

Although the description above contains much specificity, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A locking device for securing portable objects and for preventing unauthorized removal of said objects comprising:

a base having a horizontal hollow tube and an attached hollow vertical shank of a predetermined length, said tube and said shank each having a free wheeling solid metal bar mounted therein; said vertical shank further having an auger attached to a distal end thereof; said auger being adapted to be screwed securely into the ground to an appropriate depth such that the base is securely mounted to the ground;

a hollow yoke having three sides configured to form a U-shape, each said side of said yoke having mounted therein a free wheeling solid metal bar; each distal end of the yoke having securing means for slidably attaching the yoke onto the hollow tube of the base;

in use, said yoke is inverted and adapted to be placed over or around a part of the object prior to being secured and interconnected to the base by said securing means;

said horizontal tube and said securing means each having an aperture adapted to be aligned so that the device can be locked by a lock mechanism.

* * * * *